US006993047B1

(12) United States Patent
Nigam et al.

(10) Patent No.: US 6,993,047 B1

(45) Date of Patent: Jan. 31, 2006

(54) ANY SIZE AND LOCATION OF CONCATENATED PACKET DATA ACROSS SONET FRAMES IN A SONET SIGNAL

(75) Inventors: Anurag Nigam, Palo Alto, CA (US); David Stiles, Los Gatos, CA (US)

(73) Assignee: Redback Networks Inc., San Jose, CA (US)

( * ) Notice: Subject to any disclaimer, the term of this patent is extended or adjusted under 35 U.S.C. 154(b) by 1070 days.

(21) Appl. No.: 09/751,764

(22) Filed: Dec. 30, 2000

(51) Int. Cl.
*H04J 3/24* (2006.01)

(52) U.S. Cl. ...................................... 370/473; 370/429

(58) Field of Classification Search ................ 370/473, 370/389–396, 255, 401–404, 410–412, 467, 370/907, 535–536, 375–376, 429, 352, 466; 398/72, 49, 46, 55, 70–71

See application file for complete search history.

(56) References Cited

U.S. PATENT DOCUMENTS 4,667,324 A 5/1987 Graves
4,736,363 A 4/1988 Aubin et al.
5,159,595 A 10/1992 Flanagan et al.
5,608,733 A 3/1997 Vallee et al.
5,864,415 A * 1/1999 Williams et al. .............. 398/72
6,147,968 A * 11/2000 De Moer et al. ........... 370/225
6,205,142 B1 3/2001 Vallee
6,473,433 B1 * 10/2002 Bianchini et al. ........... 370/412
6,512,612 B1 * 1/2003 Fatehi et al. .................. 398/49
6,560,230 B1 * 5/2003 Li et al. ................ 370/395.42
6,587,470 B1 * 7/2003 Elliot et al. ................. 370/404
6,633,566 B1 * 10/2003 Pierson, Jr. .............. 370/395.1
6,697,373 B1 * 2/2004 Sandstrom .................. 370/405

OTHER PUBLICATIONS

Manchester, J et al;, The evolution of transport network surviability, Aug. 1999, Communication Magazine IEEE, vol. 37, Issue 8, pp. 44-51.*
Doverspike, R.D. et al;, Future transport network architecture, Aug. 1999, Communication Magazine IEEE, vol. 37, Issue 8, pp. 96-101.*
Yasuhiro Katsube et al; Internetworking based on Cell Switch Router-Architecture and Protocol Overview, Dec. 12, 1997, Proceedings of the IEEE, vol. 85, Issue 12, pp. 144-150.*

(Continued)

*Primary Examiner*—Chi Pham
*Assistant Examiner*—Prenell Jones
(74) *Attorney, Agent, or Firm*—Blakely, Sokoloff, Taylor & Zafman, LLP

(57) ABSTRACT

Any size and location of concatenated packet data across Synchronous Optical Network (SONET) frames in a SONET signal is provided. In one embodiment, a method may include receiving portions of packets and placing the portions into buffers. Additionally, the method may determine packet boundaries among the portions of packets in the buffers to locate a number of packets. Additionally, the method may concatenate the packet data into a Time Division Multiplexing (TDM) SONET signal. The concatenation can be across any locations within the TDM SONET signal, and the size of the concatenation can be in increments of single SONET frames. In another embodiment, the number of packets may be concatenated within locations in the TDM SONET signal not occupied by the TDM data traffic. In one embodiment, the TDM SONET signal having the concatenated packet data may be transmitted.

27 Claims, 6 Drawing Sheets

OTHER PUBLICATIONS

P.K. Jha, "Bandwidth Maximization for SONET/SDH and Direct Data over Optical Networks," http://www.isoc.org/inet2000/cdproceedings/1g/1g_3.htm, pp. 1-26, Nov. 16, 2000.

Robert D. Doverspike et al., "Future Transport Network Architectures", IEEE Communications Magazine, Aug. 1999, pp. 96-101.

James Manchester, "The Evolution of Transport Network Survivability", IEEE Communications Magazine, Aug. 1999, pp. 44-51.

Yasuhiro Katsube et al., "Internetworking BAsed on Cell Switch Router-Architecture and Protocol Overview", Proceedings of the IEEE, vol. 85, No. 12, Dec. 1997, pp. 1998-2006.

* cited by examiner

ANY SIZE AND LOCATION OF CONCATENATED PACKET DATA ACROSS SONET FRAMES IN A SONET SIGNAL

FIELD OF THE INVENTION

The invention relates to the field of telecommunications. More specifically, the invention relates to network elements in Synchronous Optical Network (SONET) standard and/or Synchronous Digital Hierarchy (SDH)-based telecommunication networks that allow for any size and location of concatenated Synchronous Transport Signal (STS) frames having packet data in a SONET/SDH signal.

BACKGROUND OF THE INVENTION

With the advent of the Internet and the World Wide Web (WWW), the need for high-speed transmission of data including video and audio has continued to increase. Moreover, in addition to the demand for higher bandwidth, there has also been an increased need for various types of services that employ different protocols. For example, certain customers (e.g., companies providing voice services) of high-speed networks want to operate on a Time Division Multiplexing (TDM) Network, which combines different data streams such that each data stream is assigned a time slot within the combined data stream. Moreover, other customers of high-speed networks may desire to transport data employing packet-based data streams, which do not have dedicated timeslots to given packets. Examples of the types of packets that can be placed into such data streams can include Asynchronous Transfer Mode (ATM), Internet Protocol (IP), Frame Relay, voice over IP and Point-to-Point Protocol (PPP).

Typically, Time Division Multiplexing (TDM)-based SONET and SDH technologies can transport this packet data traffic in today's market. While traditional TDM networks can currently carrying this packet data traffic, such networks are inefficient in their usage of bandwidth. In particular, TDM networks reserve different portions of bandwidth for usage by given customers, independent of whether such customers are transporting data traffic on that bandwidth. Moreover, the service deployment of such networks remains slow. As a result, there is a migration away from TDM networks toward a packet-based network, which is more dynamic in nature. In particular, a packet-based network only employs the portion of the bandwidth needed for its transmission. In other words, there are no fixed time slots in a packet-based network. However, TDM networks still have a place in the telecommunications network, as certain customers may demand the reservation of portions of bandwidth within the network, regardless of their usage of this bandwidth. Therefore, both TDM-based and packet-based networking are still needed in the field of telecommunications. Additionally, TDM signals and packet data are not mutually exclusive, as TDM signals can transport packets.

Disadvantageously, advantages gained through the use of packets are lost when such packets are placed into a TDM network. In particular, fixed time slots are reserved for the transporting of these packets on such a network. As a result, there is a need for network elements with the dynamic capability of adjusting to meet the different needs of customers, including those desiring a TDM data stream as well as those wanting a more efficient usage through networks employing packet streams.

SUMMARY OF THE INVENTION

A method and apparatus for the incorporation of any size and location of concatenated SONET frames, which carry packet data, in an SONET signal are described. In an embodiment, a method includes receiving a number of packets. Additionally, the method includes concatenating the number of packets into a Time Division Multiplexing (TDM) Synchronous Optical Network (SONET) signal. The concatenation can be across any locations within the TDM SONET signal, and a size of the concatenation can be in increments of single SONET frames. The method also includes transmitting the TDM SONET signal having the number of concatenated packets.

In one embodiment, a method includes receiving a number of packets within a first Time Division Multiplexing (TDM) Synchronous Optical Network (SONET) signal having a number of SONET frames. The number of packets is concatenated across any of the number of SONET frames within the first TDM SONET signal. Additionally, a size of the concatenation can be in increments of single SONET frames. Upon determining that the number of packets is being transmitted to a first location that cannot extract the number of packets from any of the number of SONET frames in the first TDM SONET signal, the method also includes extracting the number of packets from the first TDM SONET signal. Additionally, a number of SONET frames in a second TDM SONET signal are filled with transmission data that includes the number of packets. The filling is equally interleaved across the number of SONET frames in the second TDM SONET signal. Moreover, upon determining that the number of packets is being transmitted to the first location, the method also includes transmitting the second TDM SONET signal to the first location. Upon determining that the number of packets is being transmitted to a second location that can extract the number of packets from any of the number of SONET frames in the first TDM SONET signal, the method includes transmitting the first TDM SONET signal to the second location.

In an embodiment, a network element of a network ring includes physical connection circuitry having a number of buffers. The number of buffers holds packet data received from a different network element that is external to the network ring. Additionally, the physical connection circuitry determines packet boundaries for the packet data. The network element also includes packet processing circuitry coupled to the physical connection circuitry. The packet processing circuitry receives the packets from the physical connection circuitry and concatenates the packets into any location with a Time Division Multiplexing (TDM) Synchronous Optical Network (SONET) signal.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given element in a Figure is associated with the number of the Figure. For example, system 100 can be located in FIG. 1. However, element numbers are the same for those elements that are the same across different Figures. In the drawings.

DETAILED DESCRIPTION

A method and apparatus for the incorporation of any size and location of concatenated SONET frames, which carry packet data, in an SONET signal are described. Embodiments of the present invention are described herein in terms of a SONET signal. However, embodiments of the present invention are not so limited, as such embodiment can be employed using the SDH signal. Moreover, a SONET standard is referred to herein, which is currently defined by Bellcore GR-253. Additionally, in the following description, for purposes of explanation, numerous specific details are set forth in order to provide a thorough understanding of the present invention. It will be evident, however, to one skilled in the art that the present invention may be practiced without these specific details.

System Description

Figure 1:
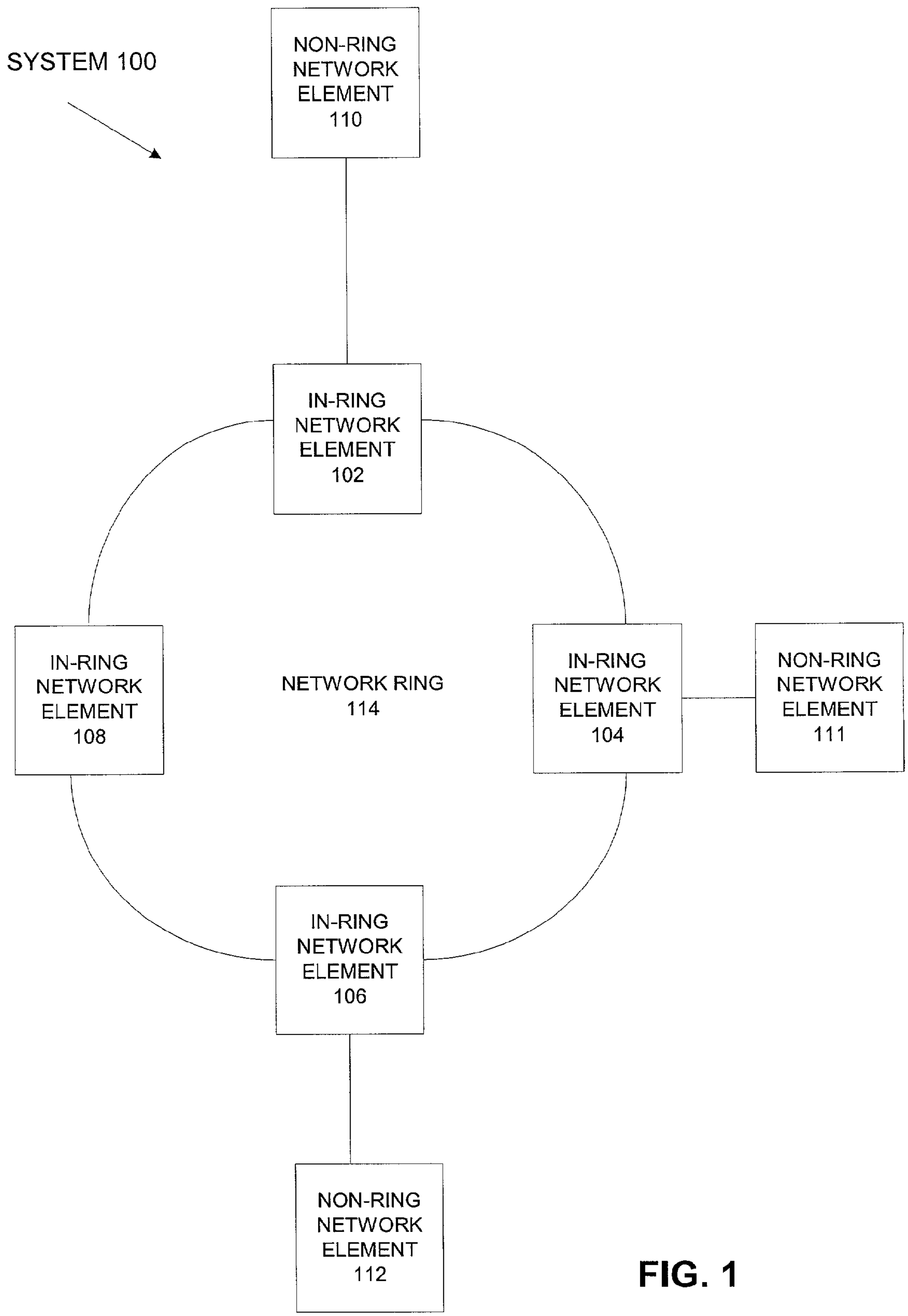
FIG. 1 is block diagram illustrating a system that incorporates embodiments of the present invention.

FIG. 1 is block diagram illustrating a system that incorporates embodiments of the present invention. In particular, FIG. 1 illustrates system 100 that includes network ring 114, which is comprised of in-ring network element 102, in-ring network element 104, in-ring network element 106 and in-ring network element 108. System 100 also include non-ring network element 110, non-ring element 111 and non-ring network element 112, which are coupled to network ring 114 through in-ring network element 102, in-ring network element 104 and in-ring network element 106, respectively. In an embodiment, non-ring elements 110–112 can be routers, switches, bridges or other types of network element that switch data across a network.

In one embodiment, the connection among in-ring network element 102, in-ring network element 104, in-ring network element 106 and in-ring network element 108 allow for bi-directional traffic. Accordingly, this bi-directional capability allows for redundancy in the communication between the different network elements, such that if a given line of communication is lost, the data traffic to be transmitted thereon can be rerouted in the opposite direction to reach its intended destination within the ring architecture.

In an embodiment, system 100 transmits data traffic among the different network elements, both in-ring and non-ring, employing the Synchronous Optical Network (SONET) standard or Synchronous Digital Hierarchy (SDH). However, embodiments of the present invention are not so limited, as data traffic among the different network elements can be transferred using other types of transmission standards. Examples of other types of transmission standards can include, but are not limited to, T1, T3, Data Signal (DS)3 and DS 1 signals. In one embodiment, data traffic among in-ring network element 102, in-ring network element 104, in-ring network element 106 and in-ring network element 108 includes TDM traffic and packet traffic within a same Time Division Multiplexing (TDM) signal.

In this ring network, network elements are used that can transmit and receive TDM ring traffic. In addition, at least certain of the network elements provide two different switching techniques—TDM and packet. The packet switching provided can support any number of protocols including layer 2 and layer 3 type protocols such as ATM, Ethernet, Frame Relay, etc. In addition to typical operations of a TDM network element, the network elements are implemented to be able to: 1) programmably select on an STS basis certain of the incoming TDM traffic to be extracted and packet switched rather than TDM switched; and/or 2) receive packet traffic in another form and to be packet switched. Regardless of which switching technique is used, the switched traffic going back onto the ring is put in TDM format and transmitted out. However, each time traffic is packet switched, that traffic can be statistically multiplexed (e.g., the packets can be selectively dropped based on various criteria). A further description of the operation of system 100 and the network elements therein is described in more detail below.

The architecture and configuration of system 100 is by way of example and not by way of limitation, as embodiments of the present invention can be incorporated in other types of systems. For example, other such systems could incorporate less or more network elements into the network ring and/or network elements attached thereto. Moreover, embodiments of the present invention are not limited to the network ring architecture as illustrated in FIG. 1. Examples of other types of network architectures that can incorporate embodiments of the present invention include, but are not limited to, a point-to-point configuration, point-to-multipoint configuration and/or a hub configuration. In addition, embodiments of the present invention are not limited to TDM networks, but also applies to Wave Division Multiplexing (WDM) networks.

Network Element Description

Figure 2:
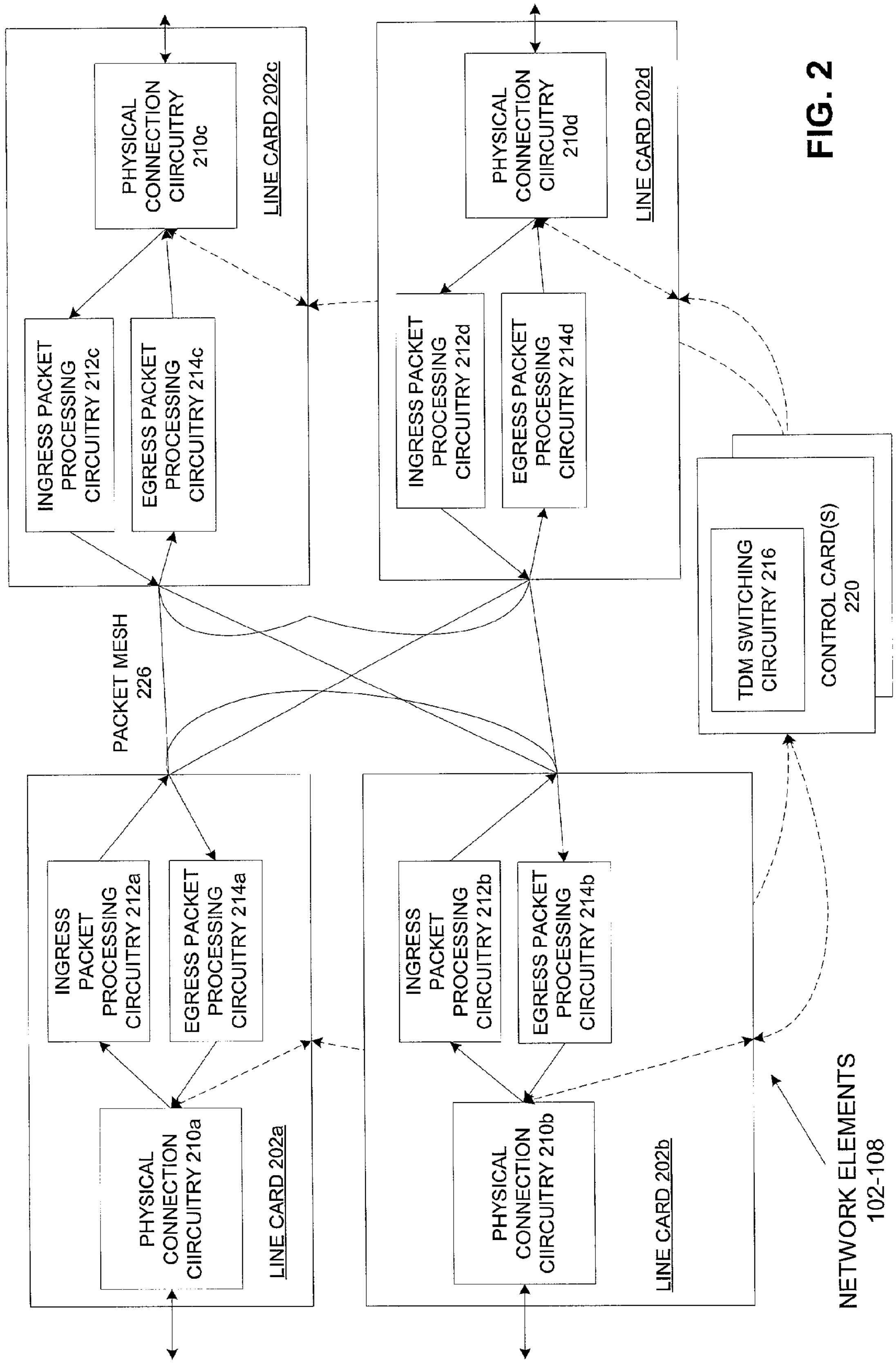
FIG. 2 illustrates portions of in-ring network elements 102–108, according to embodiments of the present invention.

FIG. 2 illustrates portions of in-ring network elements 102–108 (for purposes of FIG. 2, hereinafter "network element 102"), according to embodiments of the present invention. As shown, network element 102 includes line cards 202*a–d* and control card(s) 220, such that control card(s) 220 are coupled to each of line cards 202*a–d*. The number of line cards illustrated are for the sake of simplicity and not by way of limitation, as a lesser or greater number of line cards can be included within network element 102. Additionally, network element 102 includes a first switch fabric, packet mesh 226, which includes a full mesh such that each of line cards 202*a–d* are coupled to one another. For example, line card 202*a* is coupled to line cards 202*b–d* through packet mesh 226. However, embodiments of the present invention are not limited to a full mesh for the transmission of packets among line cards 202*a–d*, as any type of switching method that switches based on the addressing scheme described herein can be incorporated into embodiments of the present invention. For example, in one embodiment, line cards 202*a–d* could be coupled together using a switch fabric, such that the line cards are coupled to a control card, which provides for the switching therein.

Line cards 202*a–d* include physical connection circuitry 210*a–d*, ingress packet processing circuitry 212*a–d* and egress packet processing 214*a–d*, respectively. Physical connection circuitry 210*a–d* can be coupled to lines external to network element 102, as shown, which can carry optical and/or electrical signals, which is described in more detail below in conjunction with FIG. 7. In one embodiment, line cards 202*a–d* of network element 102 may be connected to an optical line transmitting SONET OC-N signals. Moreover, in an embodiment, line cards 202*a–d* of network element 102 may be connected to an electrical line such as a T1, T3, E1, E3, Ethernet, Gigabit Ethernet, etc. However, embodiments of the present invention are not limited to the above-described examples, as any other type of optical or electrical data transmission can be incorporated into embodiments of the present invention. Additionally, control cards(s) 220 include TDM switching circuitry 216.

In an embodiment, each line card 202*a–d* can be coupled to four optical and/or electrical lines. In another embodiment, each line card 202*a–d* can be coupled to eight optical and/or electrical lines. However, embodiments of the present invention are not so limited, as a lesser or greater number of optical and/or electrical lines can be coupled to network element 102 through line cards 202*a–d*. Additionally, physical connection circuitry 210*a–d* are coupled to ingress packet processing circuitry 212*a–d*, respectively, such that packet data being received from the optical and/or electrical lines is passed from physical connection circuitry 210*a–d* to ingress packet processing circuitry 212*a–d*, respectively. In one embodiment, the packet data is extracted from a TDM signal, which is described in more detail below.

Ingress packet processing circuitry 212*a–d* is coupled to packet mesh 226. Accordingly, each ingress packet processing circuitry 212*a–d* is coupled to each egress packet processing circuitry 214*a–d*, respectively, on other line cards 202*a–d* through packet mesh 226. Moreover, egress packet processing circuitry 214*a–d* is respectively coupled to physical connection circuitry 210*a–d*, such that packet data traffic coming in from packet mesh 226 from ingress packet processing circuitry 212*a–d* is transmitted from egress packet processing circuitry 214*a–d* to physical connection circuitry 210*a–d*, respectively.

Line cards incorporated into embodiments of the present invention are not limited to those illustrated by line cards 202*a–d*. Moreover, the network elements can have different line card configurations from that shown by line cards 202*a–d*. For example, a given in-ring network element could be limited to a single line card that can receive and transmit TDM traffic (which may include packet traffic) within network ring 114, employing multiple interfaces for the receipt and transmittal of TDM traffic. In another embodiment, a given in-ring network element can include a first line card to receive TDM traffic (which may include packet traffic) from another in-ring element, while a second line card can transmit TDM traffic to another or same in-ring network element. In one such embodiment, a third line card can be incorporated into this given in-ring network element to add, drop and transmit different types of traffic including different types of packet traffic, such as ATM, Frame Relay, IP, etc, received and transmitted to a non-ring network element. In another embodiment, a given network element may include a single line card with multiple interfaces such that a first interface receives TDM traffic from another in-ring network element, a second interface transmits TDM traffic to another in-ring network element and a third interface adds, drops and transmits traffic, such as packet traffic to a non-ring network element.

Accordingly, a line card is used either to connect to an in-ring network element to form part of the ring, or to provide communication with out-of ring network elements. To provide some examples with regard to a line card connected with an out-of-ring network element: 1) layer 2/3 traffic from out-of-ring network element can come in, go through the packet mesh to a line card connected to an in-ring network element, and then out onto the ring being carried by a SONET frame; 2) layer 2/3 traffic coming from an out-of-ring network element can be de-mapped into SONET, go through the TDM switch fabric to a line card connected to an in-ring network element, and then out onto the ring being carried by a SONET frame; 3) TDM traffic coming from an out-of-ring network element can come in, go through the TDM switch fabric to a line card connected to an in-ring network element, and then out onto the ring being carried by a SONET frame; 4) TDM traffic carrying layer 2/3 traffic can be processed to extract the layer 2/3 traffic, with the layer 2/3 traffic going through the packet mesh to a line card connected to an in-ring network element, and then out onto the ring carried by a SONET frame; layer 2/3 traffic coming form an out-of-ring network element can go through the packet mesh to an line card connected to an out-of-ring network element, and then go out of the ring being carried by the protocol of the interface of that egress line card; etc.

With regard to the TDM traffic, a second switch fabric (in addition to packet mesh 226) is formed among line cards 202*a–d* and TDM switching circuitry 216 of control cards 220, as illustrated by the dashed lines in FIG. 2. In particular, physical connection circuitry 210*a–d* is coupled to TDM switching circuitry 216 for the receiving and transmitting of TDM traffic into and out of network element 102. Accordingly, TDM switching circuitry 216 receive TDM traffic from physical connection circuitry 210*a–d* and switches this traffic to any of physical connection circuitry 210*a–d*, based on configuration data for the timeslots of the TDM traffic. For example, TDM switching circuitry 216 could be configured such that data within the first ten timeslots of a TDM signal, such as a SONET/SDH signal, received on a first interface of physical connection circuitry 210*a* are forwarded out the first five timeslots of a TDM signal being transmitted out from a first interface of physical connection circuitry 210*d*.

Operation of Network Elements in System Embodiments

Figure 3:
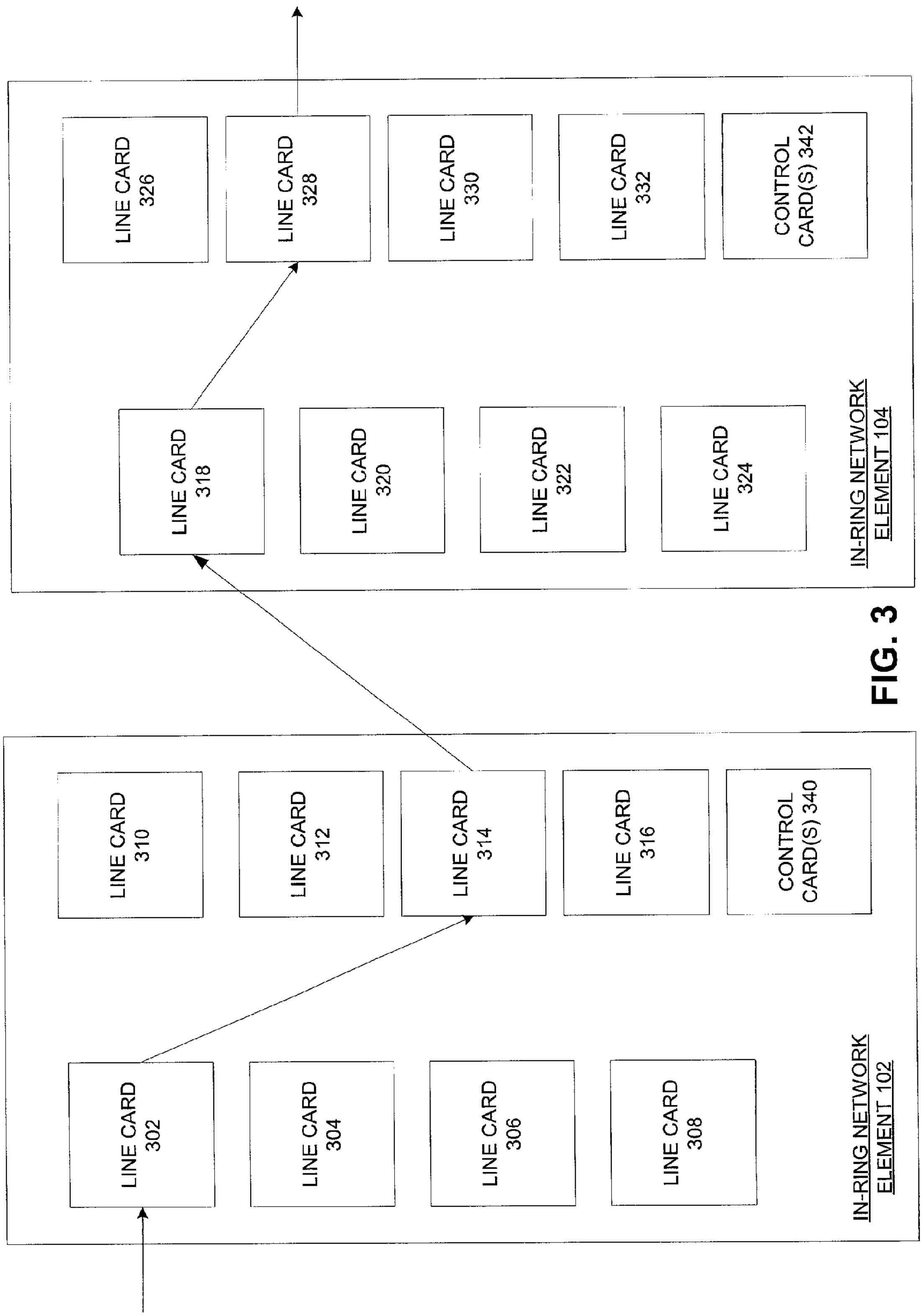
FIG. 3 illustrates a block diagram of the relationship between two in-ring network elements for the transmission of packet traffic within network ring 114, according to embodiments of the present invention.
Figure 4:
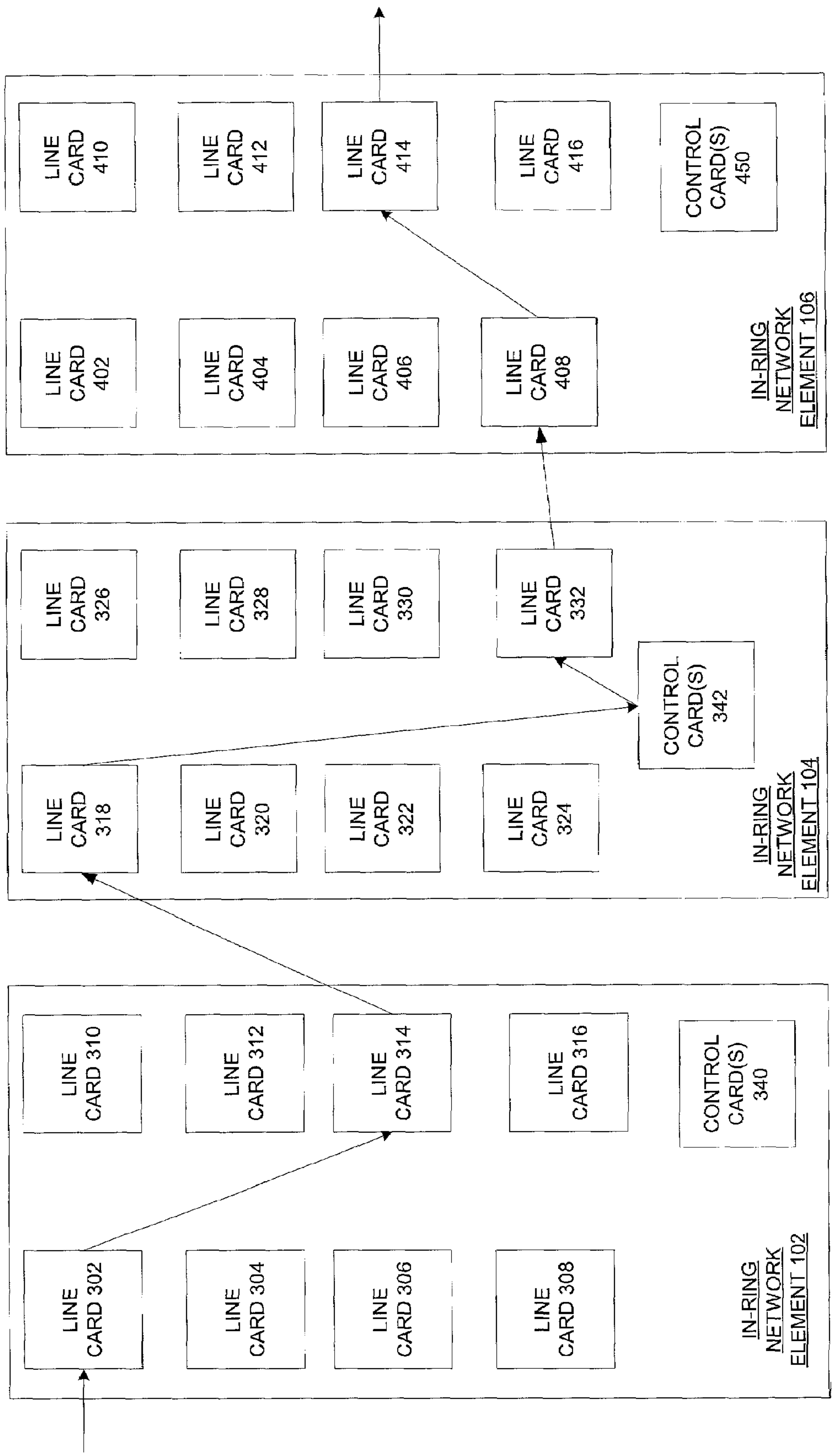
FIG. 4 illustrates a block diagram of the relationship among at least three in-ring network elements for the transmission of packet traffic within network ring 114, according to embodiments of the present invention.

FIGS. 3 and 4 illustrate block diagrams of the relationship between a number of in-ring network elements for the transmission of packet traffic within network ring 114, according to embodiments of the present invention. FIG. 3 illustrates a block diagram of the relationship between two in-ring network elements for the transmission of packet traffic within network ring 114, according to embodiments of the present invention. In particular, FIG. 3 illustrates the traversal through two in-ring network elements prior to the transmission out from network ring 114. Conversely, FIG. 4 illustrates a block diagram of the relationship among at least three in-ring network elements for the transmission of packet traffic within network ring 114, according to embodiments of the present invention.

To help illustrate, returning to system 100 of FIG. 1, FIG. 3 illustrates an embodiment of the transporting of a packet from non-ring network element 110 to in-ring network element 102 to in-ring network element 104 and out to non-ring network element 111. In contrast, FIG. 4 illustrates an embodiment of the transporting of a packet from non-ring network element 110 to in-ring network element 102 to in-ring network element 104 to in-ring network element 106 and out to non-ring network element 112.

FIG. 3 and FIG. 4 include in-ring network element 102 and in-ring network element 104. Additionally, in-ring network element 102 includes line cards 302–316 and control card(s) 340, while in-ring network element 104 includes line cards 318–332 and control card(s) 342. FIG. 4 also includes in-ring network element 106 that includes line cards 402–416 and control card(s) 450. Moreover, FIGS. 3 and 4 include the data paths for a given packet being switched through network ring 114. However, for the sake of clarity, FIGS. 3 and 4 do not include the packet meshes or the switch fabric that couple together the different line cards and control cards within a given in-ring network element and through which the data path for the given packet is transmitted, as illustrated in FIG. 2. The operation of in-ring network elements 102–106 and the transmission of the data packet illustrated in FIGS. 3 and 4 are described in more detail below, subsequent to the description of FIGS. 5 and 6.

Figure 5:
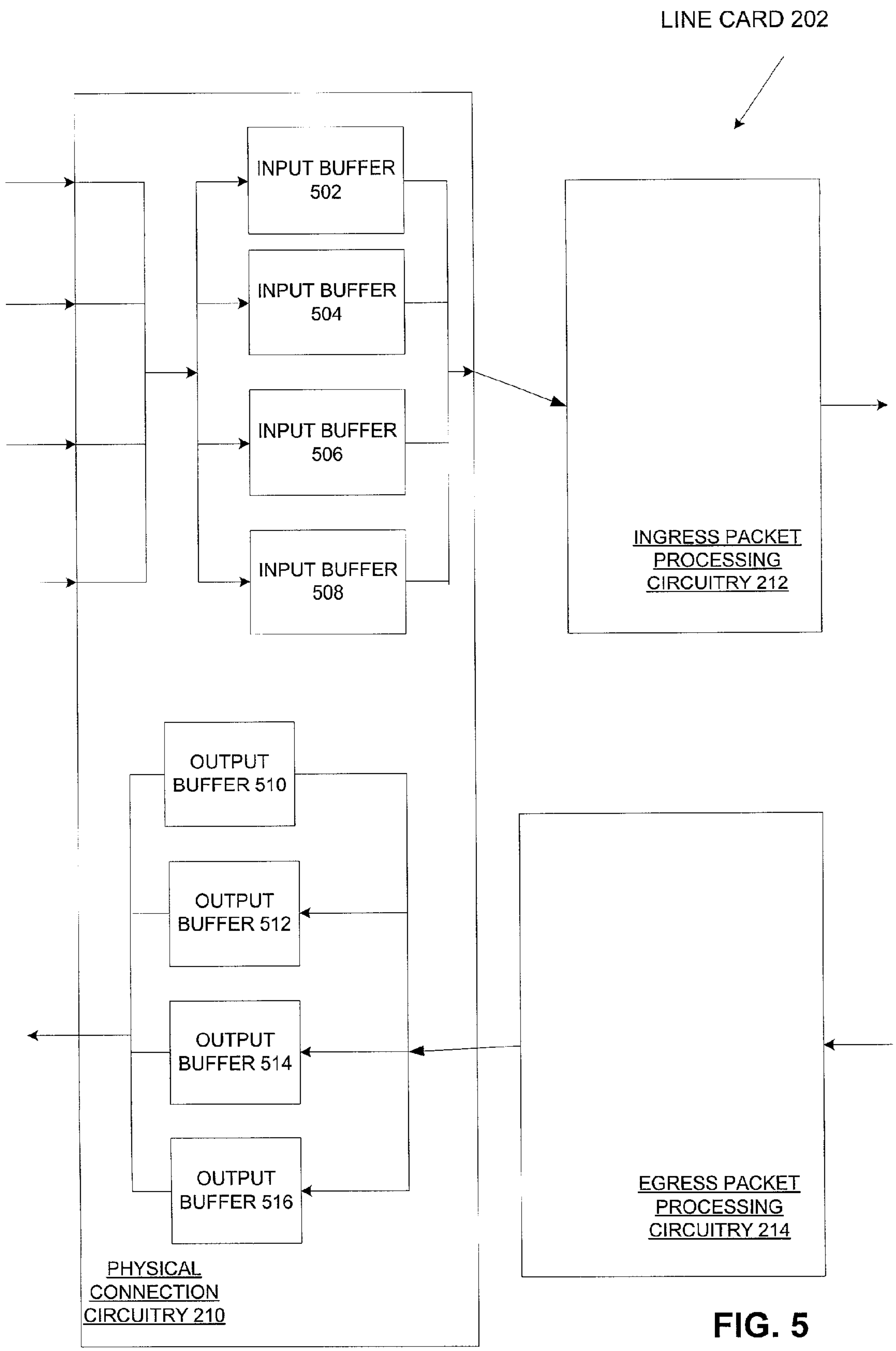
FIG. 5 illustrates a more detailed diagram of portions of a line card within a network element, according to embodiments of the present invention.

FIG. 5 illustrates a more detailed diagram of portions of a line card within a network element, according to embodiments of the present invention. In particular, FIG. 5 illustrates a more detailed diagram of physical connection circuitry 210, ingress packet processing circuitry 212, egress packet processing circuitry 214 and the interfaces there between, according to embodiments of the present invention. As shown, physical connection circuitry 210 includes input buffers 502–508 and output buffers 510–516. In an embodiment, input buffers 502–508 and output buffers 510–516 can be different types of writeable/readable memory (e.g., RAM). In one such embodiment, input buffers 502–508 are within a same memory. Similarly, in an embodiment, output buffers 510–516 are within a same memory. Additionally, because egress packet processing circuitry 214 is capable of receiving packet data from multiple ingress packet processing circuitry 212 of other line cards, egress packet processing circuitry 214 also includes a memory (not shown) for buffering of such packet data during their transmission to output buffers 510–516, which is described in more detail below.

Input buffers 502–508 and output buffer buffers 510–516 are assigned to one to a number of Synchronous Transport Signal (STS) frames in the SONET signal transmitted inside and/or outside network ring 114. In an embodiment, this assigning (i.e., provisioning) occurs dynamically through provisioning data transmitted from control cards 220. In one such embodiment, the number of STS frames to be concatenated for a given buffer can be of any size for the SONET signal being transmitted among in-ring network elements 102–108. Moreover, in an embodiment, the STS frames that are concatenated can be located anywhere within the SONET signal.

Figure 6:
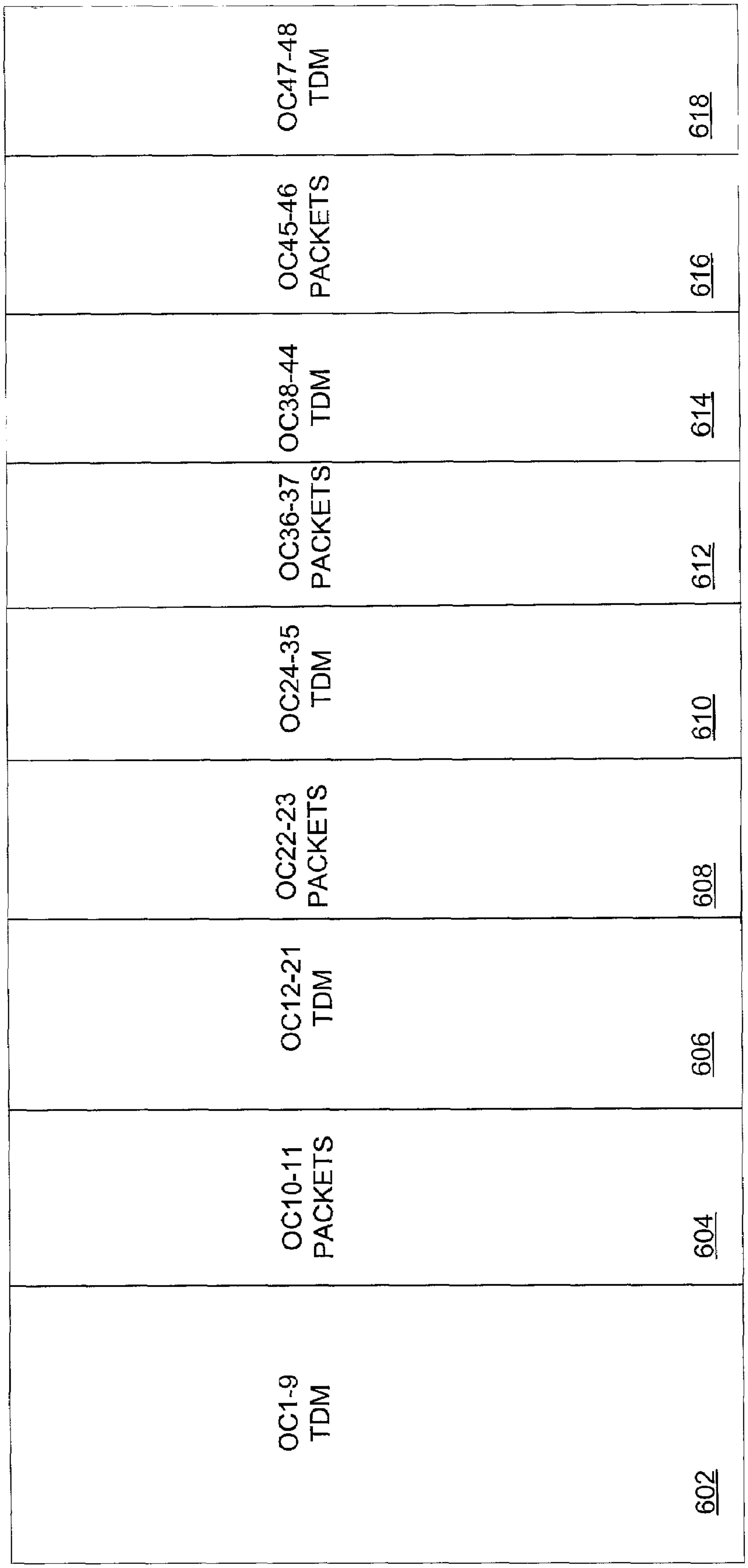
FIG. 6 is a block diagram of a SONET signal carrying both TDM data and IP packets, according to embodiments of the present invention.

To help illustrate, FIG. 6 is a block diagram of a SONET signal carrying TDM and packet traffic, according to embodiments of the present invention. In particular, FIG. 6 illustrates a OC-48 SONET signal, which could be transmitted among in-ring network elements 102–108. As shown, the 48 frames of this OC-48 signal are apportioned into different groups. In particular, TDM traffic is located in OC1–9, OC12–21, OC24–35, OC38–44 and OC47–48 within SONET portion 602, 606, 610, 614 and 618, respectively. Accordingly, the SONET signal of FIG. 6 has OC8 worth of unused bandwidth, thereby having holes at OC10–11, OC22–23, OC36–37 and OC45–46 therein. Therefore, packet traffic can be located within any of such holes in the SONET signal. In particular, packet traffic can be located in OC10–11, OC22–23, OC36–37 and OC45–46 within SONET portion 604, 608, 612 and 616, respectively. Input buffers 502–508 can, therefore, be assigned to one or any number of these OC frames not occupied by the TDM traffic. For example, in one embodiment, input buffer 502, input buffer 504, input buffer 506 and input buffer 508 can be assigned to OC10–11, OC22–23, OC36–37 and OC45–46, respectively. In further illustration in an embodiment, a single buffer can be assigned to all of the remaining OC frames. For example, input buffer 502 could be assigned to all of the OC frames not transporting TDM traffic (i.e., OC10–11, OC22–23, OC36–37 and OC45–46). The above illustrations of assignments of the OC frames to the different buffers is by way of example and not by way of limitation, as any size concatenation of OC frames across any of a number of locations in the SONET signal can be in any combination for assignment to input buffers 502–508 and output buffers 510–516.

Returning to FIGS. 3 and 4, physical connection circuitry 210 receives packet data from optical and/or electrical lines coupled to input buffers 502–508. In an embodiment, the optical line and/or electrical lines coupled to physical connection circuitry 210 are transmitting packet data across a SONET-based signal. In one embodiment, this packet data is being transmitted based on TDM. In an embodiment, the optical and/or electrical lines coupled to input buffers 502–508 are transporting the packet data using the Ethernet-based standard. In one such embodiment, the packet data is transmitted within the payload of the SONET frames. Moreover, a given packet, depending on its size, may be stretched across more than one SONET frame.

Upon receipt of the packet data, physical connection circuitry 210 of line card 302 places the packet data into one of input buffers 502–508. In an embodiment, physical connection circuitry 210 is programmed to place the packet data from given STS SONET frames into one of input buffers 502–508. For example, if physical connection circuitry 210 is coupled to an optical line transporting an OC-48 SONET signal, input buffer 502–508 could be assigned to receive OC1–4, OC5–11, OC-40–48 and OC 25, respectively. Accordingly, the data in the payload of these SONET frames are placed into the associated buffers.

Moreover, physical connection circuitry 210 locates the packet boundaries within the packet data located in input buffers 502–508. As described above, a given packet may be stretched across a number of STS-1 SONET frames. Accordingly, a given packet is not necessarily contained within a given STS-1 SONET frame. Therefore, physical connection circuitry 210 locates the boundaries between the packets stored in input buffers 502–508, by determining the beginning and ending of the packets within input buffers 502–508. Techniques for locating packet boundaries for different protocols are known in the art. For example, for an ATM protocol, an ATM header and payload are of fixed sizes such that the ATM header can be identified based on a unique bit combination, thereby allowing for the locating of the ATM packets.

Upon locating a packet boundary for a given packet, physical connection circuitry 210 forwards the packet to ingress packet processing circuitry 212. In an embodiment, ingress packet processing circuitry 212 can perform mapping, possible multiple de-encapsulating and/or multiple encapsulating of different protocol headers of the given packet, which is described in more detail in a patent application titled "A Method and Apparatus for Switching Data of Different Protocols" to David Stiles, filed on Dec. 30, 2000, Ser. No. 09/823,480 which is hereby incorporated by reference.

Subsequent to any demapping, de-encapsulation and/or encapsulation, ingress packet processing circuitry 212 forwards the packets to egress packet processing circuitry 214 of a different or same line card based on the address for the given packet. In particular, a table stored in memory within the given network element includes an association between a given address and the destination line card number as well as a port number of a given buffer within physical connection circuitry 210 of this destination line card, which is described in more detail in a patent application titled "A Method and Apparatus for Switching Data of Different Protocols" to David Stiles, filed on Dec. 30, 2000, Ser. No. 09/823,480.

Returning to FIGS. 3 and 4, to help illustrate, ingress packet processing circuitry 212 of line card 302 forwards a packet to egress packet processing circuitry 214 of line card 314 through packet mesh 226 (not shown), as illustrated by the data path between line card 302 and line card 314. Moreover, assuming that this packet is destined for output buffer 510 within line card 314, the address for this particular packet is associated with the number for line card 314 as well as the port number of output buffer 510, based on the table stored within in-ring network element 102. In an embodiment, a proprietary protocol is employed on packet mesh 226 for the transferring of packets between the different line cards. In one such embodiment, the protocol allows for the transfer of the port number of the given output buffer to which the packet is destined within the line card to which such a packet is being forwarded.

As described above, egress packet processing circuitry 214 includes a memory for the temporary storage of packets, which can be received from various ingress packet processing circuitry 212 on different line cards within a given in-ring network element. For example, egress packet processing circuitry 214 of line card 314 can receive packets from ingress packet processing circuitry 212 from any of line cards 302–316. Upon receipt of packets, in an embodiment, egress packet processing circuitry 214 can de-encapsulate and/or encapsulate the incoming packets with protocol headers, which is described in more detail in a patent application titled "A Method and Apparatus for Switching Data of Different Protocols" to David Stiles, filed on Dec. 30, 2000, Ser. No. 09/823,480. Additionally, egress packet processing circuitry 214 forwards these packets to physical connection circuitry 210. Physical connection circuitry 210 places a given packet into a given output buffer based on the port number of the buffer associated therewith. In an embodiment, a proprietary protocol allows for the transmitting of the port number of the buffer for a given packet between egress packet processing circuitry 214 and physical connection circuitry 210.

As described above, a given output buffer can be provisioned to be associated with one to a number of SONET frames within a TDM-based SONET signal being transmitted among in-ring network elements 102–108. In one such embodiment, the number of SONET frames to be concatenated for a given output buffer can be of any size. Moreover, in an embodiment, the concatenated SONET frames can be located anywhere within the TDM-based SONET signal, as illustrated by the SONET signal of FIG. 6. Physical connection circuitry 210 places the received packets located in output buffers 510–516 into the payload of SONET frames. Additionally, physical connection circuitry 210 places such SONET frames into the timeslots within the TDM-based SONET signal that are associated with the output buffer from which the packet was extracted. For example, output buffer 510 could be associated with SONET frames OC1, OC5–10 and OC47–48 of a TDM-based SONET signal. Accordingly, packets located in output buffer 510 can be placed into any of OC1, OC5–10 and OC47–48 within the TDM-based SONET signal. Once the packet is transmitted within one of the particular timeslots in the TDM-based SONET signal, this packet can be received by physical connection circuitry 210 of the line card in the network element for which such a packet is destined.

Returning to FIGS. 3 and 4 to help illustrate, this given packet is transmitted from line card 314 of in-ring network element 102 to line card 318 of in-ring network element 104 through the TDM-based SONET signal being transported among in-ring network elements 102–108. Accordingly, this packet is received by physical connection circuitry 210 of line card 318. The subsequent transmission of the packet deviates between FIG. 3 and FIG. 4. Accordingly, the remaining transmission of the packet illustrated in FIG. 3 and FIG. 4 will now be described separately below.

With regard to the remaining transmission of the packet illustrated in FIG. 3, after receiving this given packet, physical connection circuitry 210 of line card 318 places this packet into one of input buffers 502–508, depending on which OC frames are associated with input buffers 502–508, as described above. Moreover, because this given packet can be combined with other packet data being received from other sources, including from non-ring network elements, physical connection circuitry 210 may need to relocate the packet boundaries for the packet data within input buffers 502–508, as described above. Once the packets are identified, physical connection circuitry 210 forwards these packets to ingress packet processing circuitry 212 of line card 318, as described above.

Upon receipt of packets, in an embodiment, ingress packet processing circuitry 212 can map, de-encapsulate and/or encapsulate the incoming packets with protocol headers, which is described in more detail in a patent application titled "A Method and Apparatus for Switching Data of Different Protocols" to David Stiles, filed on Dec. 30, 2000, Ser. No. 09/823,480. Additionally, ingress packet processing circuitry-212 of line card 318 forwards the packet to egress packet processing circuitry 214 of line card 328 through packet mesh 226 (not shown), as illustrated by the data path between line card 318 and line card 328. Moreover, assuming that this packet is destined for output buffer 510 within line card 328, the address for this particular packet is associated with the number for line card 328 as well as the port number of output buffer 510, based on the address stored in the tables located within in-ring network element 104. In an embodiment, a proprietary protocol is employed on packet mesh 226 for the transferring of packets between the different line cards. In one such embodiment, the protocol allows for the transfer of the port number of the given output buffer to which the packet is destined within the line card to which such a packet is being forwarded.

Upon receipt of packets, in an embodiment, egress packet processing circuitry 214 of line card 328 can de-encapsulate and/or encapsulate the incoming packets with protocol headers, which is described in more detail in a patent application titled "A Method and Apparatus for Switching Data of Different Protocols" to David Stiles, filed on Dec. 30, 2000, Ser. No. 09/823,480. Moreover, egress packet processing circuitry 214 of line card 328 forwards this packet to physical connection circuitry 210 of line card 328. Physical connection circuitry 210 places a given packet into a given output buffer based on the port number of the buffer associated therewith. In an embodiment, a proprietary protocol allows for the transmitting of the port number of the buffer for a given packet between egress packet processing circuitry 214 and physical connection circuitry 210.

In contrast to the transmission of a packet between in-ring network elements, this packet is being transmitted to a network element external to network ring 114. Accordingly, for those packets being transmitted external to network ring 114 on a SONET-based signal, the standards associated with the SONET protocol, including Bellcore GR-253, must be followed in order to communicate with SONET standard-based network elements. Currently, such a standard does not allow for the number of STS frames within a SONET signal to be of any size of concatenation. Moreover, such a standard does not allow such concatenated STS frames to be located anywhere within the SONET signal.

For example, under these current SONET standards, the base signal of STS-1 can be expanded to include 3 STS frames (STS-3) and multiples of four thereafter (e.g., STS-12, STS-48 and STS-192). Moreover, under the current SONET standard, a given set of STS frames are required to be equally interleaved (i.e., concatenated) within a given SONET signal. For example, if a given SONET signal includes 48 STS frames (i.e., an STS-48 signal) and only 12 of the STS frames are currently carrying data traffic (i.e., STS-12), these 12 STS frames are interleaved equally across the STS-48 signal. Accordingly, every fourth STS frame is transmitting data traffic. In other words in contrast to in-ring network elements 102–108 (network elements according to embodiments of the present invention), for those network elements that are limited to carrying data traffic based on the SONET standard, the concatenation or interleaving of a given set of STS frames could not be of any size, such as STS-11, across any location, such as the first 11 STS frames.

Therefore, for those output buffers 510–516 within physical connection circuitry 210 of line card 328 that are transmitting packets to network elements external to network ring 114 using a SONET signal, such buffers are programmed to place the packets into SONET standard-based locations within the SONET signal being transmitted to a non-ring network element. Returning to FIG. 3 to help illustrate, assuming that the packet transmission between in-ring network element 104 and non-ring network element 111 is SONET-based, output buffer 510 of line card 328 is associated with SONET standard-based locations within such a signal. For example, if the SONET signal is OC-12 and output buffer 510 is associated with OC-3, this packet within output buffer 510 could be placed in the OC1, OC6 or OC12 locations.

Embodiments of the present invention were described in terms of a SONET signal being transmitted between in-ring network element 104 and non-ring network element 111. However, embodiments of the present invention are not so limited, as other types of data transmission signals can be employed. For example, if non-ring network element 111 is a router, this signal could be a packet-based stream.

Returning to FIG. 4 to describe the completion of the packet transmission therein, the given packet is located within physical connection circuitry 210 of line card 318. Describing the remaining packet transmission of FIG. 4 generally, because the packet is being routed through at least three in-ring network elements within network ring 114, this given packet may remain in possibly any location of any concatenation within the TDM data stream because the packet is being transmitted between two in-ring network elements that can process packets within these non-SONET based standard locations. Accordingly, the switch fabric of certain in-ring network elements may be employed for the transmission of the packet inside network ring 114, instead of packet mesh 226 therein, as illustrated by the transmission of the packet in FIG. 3.

In particular, this given packet that is located within at least one STS frame of the SONET signal, which is transmitted between in-ring network element 102 and 104, is transmitted through the switch fabric of in-ring network element 104, as this packet remains in this STS frame of the TDM-based SONET signal between in-ring network elements 104 and 106. Physical connection circuitry 210 of line card 318, therefore, transmits this at least one STS frame containing the packet to TDM processing circuitry 216 of line card 318. In turn, TDM processing circuitry transmits this STS frame to control card 220 of line card 318. Control card 220 determines which outgoing line card within in-ring network element 104 that this STS frame is destined to be transmitted through, based on forwarding tables therein.

As shown by FIG. 4, control card(s) 342 transmits this STS frame to TDM processing circuitry 216 of line card 332. Accordingly, TDM processing circuitry 216 receives and transmits this STS frame to physical connection circuitry 210 of line card 332. In turn, physical connection circuitry 210 of line card 332 transmits this STS frame to physical connection circuitry 210 of line card 408 within in-ring network element 106. Therefore, this STS frame containing the packet is received by physical connection circuitry 210 of line card 408. Moreover, because this packet is being transmitted to a network element external to network ring 114 (i.e., non-ring network element 112), this packet will need to be extracted from the STS frame. In particular, this packet will need to be extracted from the STS frame because this STS frame may be in a set of concatenated frames of any size, which is not compliance with current SONET standards, including Bellcore GR-253. Accordingly, physical connection circuitry 210 removes the packet from the STS frame(s) and buffers this data in one of input buffers 502–508 that is assigned to the STS frame(s), as described above.

Moreover, because this given packet can be combined with other packet data being received from other sources, including from non-ring network elements, physical connection circuitry 210 of line card 408 may need to relocate the packet boundaries for the packet data within input buffers 502–508, as described above. Once the packets are identified, physical connection circuitry 210 forwards these packets to ingress packet processing circuitry 212 of line card 408, as described above.

Ingress packet processing circuitry 212 of line card 408 can de-encapsulate and/or encapsulate the incoming packets with protocol headers, which is described in more detail-in a patent application titled “A Method and Apparatus for Switching Data of Different Protocols” to David Stiles, filed on Dec. 30, 2000, Ser. No. 09/823,480. Additionally, ingress packet processing circuitry 212 of line card 408 forwards the packet to egress packet processing circuitry 214 of line card 414 through packet mesh 226 (not shown), as illustrated by the data path between line card 408 and line card 414. Moreover, assuming that this packet is destined for output buffer 510 within line card 414, the address for this particular packet is associated with the number for line card 414 as well as the port number of output buffer 510, based on the address stored in the tables located within in-ring network element 106.

Upon receipt of this packet, egress packet processing circuitry 214 of line card 414 forwards this packet to physical connection circuitry 210 of line card 414. Physical connection circuitry 210 places a given packet into a given output buffer based on the port number of the buffer associated therewith. In contrast to the transmission of a packet between in-ring network elements, this packet is being transmitted to a network element external to network ring 114. Accordingly, for those packets being transmitted external to network ring 114 on a SONET-based signal, the standards, including Bellcore GR-253, associated with the SONET protocol must be followed in order to communicate with SONET standard-based network elements. As described above, currently, such standards do not allow for the number of STS frames within a SONET signal to be of any size of concatenation. Moreover, such standards do not allow such concatenated STS frames to be located anywhere within the SONET signal.

Therefore, for those output buffers 510–516 within physical connection circuitry 210 of line card 414 that are transmitting packets to network elements external to network ring 114 using a SONET signal, such buffers are programmed to place the packets into SONET standard-based locations within the SONET signal being transmitted to a non-ring network element. This packet is transmitted to non-ring network element 112. In an embodiment wherein the in-ring network element 106 and non-ring network element 112 are communicating through a SONET signal, this packet is located within a SONET standard-based location within this SONET signal.

The embodiment of the packet transmission illustrated in FIG. 4 is by way of example and not by way of limitation, as other methods can be employed in the routing of the packet across network ring 114. In one such embodiment, the data packet transmission internal to in-ring network element 104 could be through the different packet processing circuitry and packet mesh 226. For example, if a number of concatenated STS frames within a SONET signal being transmitted between two in-ring network elements include more than one customer, the physical processing circuitry in the line cards may need to remove the packets in these concatenated frames to allow different packets to be transmitted outside network ring 114 each time this concatenated frame enters an in-ring network element.

Returning to FIG. 1 to help illustrate, assume packets from customer A are being transmitted from non-ring network element 110 to non-ring network element 112 through in-ring network elements 102–106. Assume also that packets from customer B are being transmitted from non-ring network element 110 to non-ring network element 111 through in-ring network elements 102–104. Additionally, the packets from customer A and B share a concatenated set of STS frames in the SONET signal within network ring 114. Therefore, in each of in-ring network elements 102–106, these packets would need to be removed from the STS frames to determine whether the routing of such packets.

Accordingly, this filling of holes within the SONET signal provides a more efficient use of the bandwidth of the SONET signal. In particular, the SONET standard requires integer multiples of STS-1 (e.g., STS-3, STS-12 and STS-48) for the interleaving of the multiple frames within a SONET signal, which causes holes within the SONET signal to be present that cannot be filled for a given set of customers. For example, if STS-2 worth of bandwidth remained in a given SONET signal and the minimum for a given customer is STS-3, this bandwidth is wasted. However, as shown, embodiments of the present invention fill the holes in the SONET signal with any size and location of packets.

The line cards and control cards included in the different network elements include memories, processing elements and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processing elements and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, a method and apparatus for the incorporation of any size and location of concatenated SONET frames, which carry packet data, in a SONET signal have been described. Although the present invention has been described with reference to specific exemplary embodiments, it will be evident that various modifications and changes may be made to these embodiments without departing from the broader spirit and scope of the invention.

For example, the processing of the TDM and packet data were described in terms of execution by multiple line cards and multiple processing elements (e.g., ingress packet processing circuitry 212). However, embodiments of the present invention are not so limited. For example, a single line card could incorporate the processing described across multiple line cards in the network elements. Moreover, a single processing element could incorporate the processing described across multiple processing elements.

To further illustrate possible modifications to embodiments of the present invention, the buffers shown within the different processing elements could be removed if the processing by the processing elements was executing at such a rate that buffers were not required to hold the received data. Accordingly, the specification and drawings are to be regarded in an illustrative rather than a restrictive sense.

What is claimed is:

1. A method comprising:
- receiving portions of packets;
- placing the portions of packets into buffers;
- determining packet boundaries among the portions of packets in the buffers, wherein the determining of the packet boundaries locates a number of packets;
- concatenating the number of packets into a Time Division Multiplexing (TDM) Synchronous Optical Network (SONET) signal, wherein the concatenation can be across any locations within the TDM SONET signal and wherein a size of the concatenation can be in increments of single SONET frames; and
- transmitting the TDM SONET signal having the number of concatenated packets.

2. The method of claim 1, wherein the number of packets are concatenated within locations in the TDM SONET signal not occupied by TDM data traffic.

3. The method of claim 1, wherein the transmitting of the TDM SONET signal is between two network elements in a network ring.

4. A network element of a network ring comprising:
- physical connection circuitry having a number of buffers, the number of buffers to hold packet data received from a different network element that is external to the network ring, the physical connection circuitry to determine packet boundaries from the packet data; and packet processing circuitry coupled to the physical connection circuitry, the packet processing circuitry to receive the packets from the physical connection circuitry and to concatenate the packets into any location with a Time Division Multiplexing (TDM) Synchronous Optical Network (SONET) signal.

5. The network element of claim 4, wherein a size of the concatenation can be in increments of single SONET frames.

6. A network comprising:

a first set of network elements, at least one of the first set of network elements to transmit packet data; and a second set of network elements, the second set of network elements to transmit a Time Division Multiplexing (TDM) Synchronous Optical Network (SONET) signal, the TDM SONET signal having a number of SONET frames, wherein each of the second set of network elements includes:

physical connection circuitry having a number of buffers, the number of buffers to hold portions of the packet data received from the at least one of the first set of network elements, the physical connection circuitry to determine packet boundaries for the packet data; and packet processing circuitry coupled to the physical connection circuitry, the packet processing circuitry to receive the packets from the physical connection circuitry and to concatenate the packets into any location with a Time Division Multiplexing (TDM) Synchronous Optical Network (SONET) signal.

7. The network of claim 6, wherein the number of packets are concatenated within locations in the TDM SONET signal not occupied by TDM data traffic.

8. The network of claim 6, wherein the at least one non-ring network element includes a router.

9. The network of claim 6, wherein a communication of packets between the number of network elements and the at least one non-ring network element is within a TDM SONET signal such that the number of frames transmitting the number of packets are concatenated evenly across the TDM SONET signal.

10. A machine-readable medium that provides instructions, which when executed by a machine, cause said machine to perform operations comprising:

receiving packet data;

placing the packet data into buffers;

determining packet boundaries among the packet data in the buffers, wherein the determining of the packet boundaries locates a number of packets;

concatenating the number of packets into a Time Division Multiplexing (TDM) Synchronous Optical Network (SONET) signal, wherein the concatenation can be across any locations within the TDM SONET signal and wherein a size of the concatenation can be in increments of single SONET frames; and transmitting the TDM SONET signal having the number of concatenated packets.

11. The machine-readable medium of claim 10, wherein the number of packets are concatenated within locations in the TDM SONET signal not occupied by TDM data traffic.

12. The machine-readable medium of claim 10, wherein the transmitting of the TDM SONET signal is between two network elements in a network ring.

13. A method comprising:

receiving portions of packets;

placing the portions of packets into buffers;

determining packet boundaries among the portions of packets in the buffers, wherein the determining of the packet boundaries locates a number of packets;

concatenating the number of packets into a Time Division Multiplexing (TDM) Synchronous Optical Network (SONET) signal, wherein the concatenation can be across any locations within the TDM SONET signal, wherein a size of the concatenation can be in increments of single SONET frames, and wherein the number of packets are concatenated within locations in the TDM SONET signal not occupied by TDM data traffic; and transmitting the TDM SONET signal having the number of concatenated packets.

14. The method of claim 13, wherein the transmitting of the TDM SONET signal is between two network elements in a network ring.

15. A network element of a network ring comprising:

physical connection circuitry having a number of buffers, the number of buffers to hold packet data received from a different network element that is external to the network ring, the physical connection circuitry to determine packet boundaries from the packet data; and packet processing circuitry coupled to the physical connection circuitry, the packet processing circuitry to receive the packets from the physical connection circuitry and to concatenate the packets into any location with a Time Division Multiplexing (TDM) Synchronous Optical Network (SONET) signal, wherein the packets are concatenated within locations in the TDM SONET signal not occupied by TDM data traffic.

16. The network element of claim 15, wherein a size of the concatenation can be in increments of single SONET frames.

17. A network comprising:

a first set of network elements, at least one of the first set of network elements to transmit packet data; and a second set of network elements, the second set of network elements to transmit a Time Division Multiplexing (TDM) Synchronous Optical Network (SONET) signal, the TDM SONET signal having a number of SONET frames, wherein each of the second set of network elements includes:

physical connection circuitry having a number of buffers, the number of buffers to hold portions of the packet data received from the at least one of the first set of network elements, the physical connection circuitry to determine packet boundaries for the packet data, and packet processing circuitry coupled to the physical connection circuitry, the packet processing circuitry to receive the packets from the physical connection circuitry and to concatenate the packets into any location with a Time Division Multiplexing (TDM) Synchronous Optical Network (SONET) signal, wherein the packets are concatenated within locations in the TDM SONET signal not occupied by TDM data traffic.

18. The network of claim 17, wherein the at least one non-ring network element includes a router.

19. The network of claim 17, wherein a communication of packets between the number of network elements and the at least one non-ring network element is within a TDM SONET signal such that the number of frames transmitting the number of packets are concatenated evenly across the TDM SONET signal.

20. A machine-readable medium that provides instructions, which when executed by a machine, cause said machine to perform operations comprising:

receiving packet data;

placing the packet data into buffers;

determining packet boundaries among the packet data in the buffers, wherein the determining of the packet boundaries locates a number of packets;

concatenating the number of packets into a Time Division Multiplexing (TDM) Synchronous Optical Network (SONET) signal, wherein the concatenation can be across any locations within the TDM SONET signal, wherein a size of the concatenation can be in increments of single SONET frames, and wherein the number of packets are concatenated within locations in the TDM SONET signal not occupied by TDM data traffic; and transmitting the TDM SONET signal having the number of concatenated packets.

21. The machine-readable medium of claim 10, wherein the transmitting of the TDM SONET signal is between two network elements in a network ring.

22. A method comprising:

receiving packet data;

concatenating the packet data into a Time Division Multiplexing (TDM) Synchronous Optical Network (SONET) signal, wherein the concatenation can be across any locations within the TDM SONET signal, wherein a size of the concatenation can be in increments of single SONET frames, and wherein the number of packets are concatenated within locations in the TDM SONET signal not occupied by TDM data traffic; and transmitting the TDM SONET signal having the concatenated packet data.

23. The method of claim 22, wherein the packet data is concatenated within locations in the TDM SONET signal not occupied by TDM data traffic.

24. The method of claim 22, wherein the transmitting of the TDM SONET signal is between two network elements in a network ring.

25. A machine-readable medium that provides instructions, which when executed by a machine, cause said machine to perform operations comprising:

receiving packet data;

concatenating the packet data into a Time Division Multiplexing (TDM) Synchronous Optical Network (SONET) signal, wherein the concatenation can be across any locations within the TDM SONET signal, wherein a size of the concatenation can be in increments of single SONET frames, and wherein the number of packets are concatenated within locations in the TDM SONET signal not occupied by TDM data traffic; and transmitting the TDM SONET signal having the concatenated packet data.

26. The machine-readable medium of claim 25, wherein the packet data is concatenated within locations in the TDM SONET signal not occupied by TDM data traffic.

27. The machine-readable medium of claim 25, wherein the transmitting of the TDM SONET signal is between two network elements in a network ring.

* * * * *